(12) United States Patent
Furuya et al.

(10) Patent No.: US 9,065,581 B2
(45) Date of Patent: Jun. 23, 2015

(54) OPU FRAME GENERATING DEVICE AND OPU FRAME TEST DEVICE

(75) Inventors: Takashi Furuya, Atsugi (JP); Tsuyoshi Ogawa, Atsugi (JP)

(73) Assignee: ANRITSU CORPORATION, Kanagawa (JP)

( * ) Notice: Subject to any disclaimer, the term of this patent is extended or adjusted under 35 U.S.C. 154(b) by 745 days.

(21) Appl. No.: 13/433,370

(22) Filed: Mar. 29, 2012

(65) Prior Publication Data

US 2012/0257888 A1 Oct. 11, 2012

(30) Foreign Application Priority Data

Apr. 8, 2011 (JP) .................................. 2011-086002

(51) Int. Cl.
*H04J 3/16* (2006.01)
*H04J 3/14* (2006.01)

(52) U.S. Cl.
CPC .................. *H04J 3/1652* (2013.01); *H04J 3/14* (2013.01); *H04J 2203/0073* (2013.01)

(58) Field of Classification Search
None
See application file for complete search history.

(56) References Cited

U.S. PATENT DOCUMENTS

| 8,340,134 B1 * | 12/2012 | Gorshe | 370/476 |
| 2010/0226648 A1 * | 9/2010 | Katagiri et al. | 398/66 |
| 2011/0236031 A1 * | 9/2011 | Itou | 398/141 |

OTHER PUBLICATIONS

ITU-T, G.709/Y.1331 , "Series G: Transmission Systems and Media, Digital Systems and Networks—Digital terminal equipments—General" and "Series Y: Global Information Infrastructure, Internet Protocol Aspects and Next—Generation Networks—Internet protocol apsects—Transport", Interfaces for the Optical Transport Network (OTN), International Telecommunication Union, Dec. 2009.

ITU-T, G.709/Y.1331 Amendment 1 , "Series G: Transmission Systems and Media, Digital Systems and Networks—Digital terminal equipments—General" and "Series Y: Global Information Infrastructure, Internet Protocol Aspects and Next—Generation Networks—Internet protocol apsects—Transport", Interfaces for the Optical Transport Network (OTN), International Telecommunication Union, Jul. 2010.

ITU-T, G.709/Y.1331 Amendment 2 , "Series G: Transmission Systems and Media, Digital Systems and Networks—Digital terminal equipments—General" and "Series Y: Global Information Infrastructure, Internet Protocol Aspects and Next—Generation Networks—Internet protocol apsects—Transport", Interfaces for the Optical Transport Network (OTN), International Telecommunication Union, Apr. 2011.

\* cited by examiner

*Primary Examiner* — Ian Moore
*Assistant Examiner* — Brian T Le
(74) *Attorney, Agent, or Firm* — Pearne & Gordon LLP

(57) ABSTRACT

An OPU frame generating device includes a frequency setting unit that sets a frequency corresponding to a bit rate of data which can be stored in a payload area, a parameter calculating unit that calculates a parameter $C_m$ indicating an integer part of the amount of data included in the payload area using the set frequency, a data inserting unit that outputs a timing signal determined by the parameter $C_m$ and inserts data at a position determined by the parameter $C_m$ in the payload area, a data generating unit that generates data in synchronization with the timing signal, and a frame generating unit that generates an OPU frame having the payload area into which the data is inserted.

8 Claims, 6 Drawing Sheets

OPU FRAME GENERATING DEVICE AND OPU FRAME TEST DEVICE

TECHNICAL FIELD

The present invention relates to an OPU frame generating device and an OPU frame test device for testing a bit rate adjustment function defined by ITU-T Rec. G. 709 (December/2009).

BACKGROUND ART

The bit rate of OTN (Optical Transport network) is defined on the basis of the bit rate of SONET (Synchronous Optical Network)/SDH (Synchronous Digital Hierarchy). Therefore, it is necessary to expand the OTN standard whenever Ethernet (registered trademark) or a fiber channel with a different bit rate is newly added.

However, it is not preferable to expand the standard whenever a new client signal appears. Therefore, ITU-T Rec. G. 709 (December/2009) uses GMP (Generic Mapping Procedure) in order to respond to client signals with any bit rate which will appear in the future. GMP is a method for mapping the client signal with a bit rate less than the capacity of a payload to the payload area. As shown in FIG. 7, a transmitting unit distributes data and stuff in the payload area. As shown in FIG. 8, JC bytes JC1 to JC6 for adjusting the bit rate are stored in an OH (Over Head). In addition, a term "stuff" described in the following specification and drawings is a term defined in ITU-T Rec. G. 709 (December/2009) standard.

The JC bytes JC1 and JC2 indicate a parameter $C_m$ indicating an integer part of the amount of data included in the payload area which is calculated by the calculating unit and the varying conditions of the parameter $C_m$ indicating the integer part, respectively. The JC byte JC3 is CRC (Cyclic Redundancy Check) of the JC byte JC1 and the JC byte JC2. The JC bytes JC4 and JC5 are the sum $\Sigma C_{nD}$ of the remainders $C_{nD}$ for each frame when the amount of data included in the payload area is divided by $C_m$ and are represented in hexadecimal notation. The JC byte JC6 is CRC of the JC byte JC4 and the JC byte JC5. A receiving unit detects the OPU frame from a received signal, extracts the JC bytes arranged in the OH, calculates each parameter inserted by the transmitter side using the JC bytes JC1 to JC6, moves the amount of extracted data according to the procedure corresponding to the parameters and the varying conditions, and receives the amount of data equal to the amount of data inserted by transmitting unit.

RELATED ART DOCUMENT

Non-Patent Document

[Non-patent Document 1] ITU-T Rec. G. 709 (December/2009)

DISCLOSURE OF THE INVENTION

Problem that the Invention is to Solve

In order to follow ITU-T Rec. G. 709 (December/2009), the transmitting unit needs to store, in the payload area, data with an arbitrary bit rate which can be stored in the payload area and the receiving unit needs to correctly extract the data from the payload area having the data stored therein.

An object of the invention is to generate an OPU (Optical Channel Payload Unit) frame having a payload area in which data with an arbitrary bit rate which can be stored in the payload area is stored.

Means for Solving Problem

In order to achieve the object, according to an aspect of the invention, an OPU frame generating device includes a frequency setting unit (11) that sets an arbitrary frequency which can be stored in a payload area, a parameter calculating unit (14) that calculates a parameter $C_m$ indicating an integer part of the amount of data included in the payload area using the frequency set by the frequency setting unit, a data inserting unit (15) that outputs a timing signal determined by the parameter $C_m$ calculated by the parameter calculating unit and inserts data at a position determined by the parameter $C_m$ in the payload area, a data generating unit (13) that generates data in synchronization with the timing signal and outputs the timing signal to the data inserting unit, a frame generating unit (16) that generates an OPU frame having the payload area in which the data has been inserted by the data inserting unit, and a second oscillating unit (17) that generates a second clock signal for driving the parameter calculating unit, the data inserting unit, and the frame generating unit.

Since the OPU frame generating device according to the above-mentioned aspect of the invention includes the frequency setting unit (11), the parameter calculating unit (14), and the data generating unit (13), it can generate data with an arbitrary bit rate which can be stored in the payload area. Since the OPU frame generating device according to the above-mentioned aspect of the invention includes the data inserting unit (15), the frame generating unit (16), and the second oscillating unit (17), it can generate the OPU frame in which data with an arbitrary bit rate is stored in the payload area.

In the OPU frame generating device according to the above-mentioned aspect of the invention, the frequency setting unit may set an arbitrary frequency range which can be stored in the payload area and sequentially change the frequency in the set frequency range. The parameter calculating unit may sequentially calculate the parameter $C_m$ using the frequency which is sequentially changed. The data inserting unit may acquire the parameter $C_m$ which is sequentially changed from the parameter calculating unit, sequentially generate the timing signal using the parameter $C_m$ which is sequentially changed, and insert the data with a common frequency from the data generating unit at a position determined by the acquired parameter $C_m$ in the payload area. The data generating unit may sequentially generate data in synchronization with the timing signal which is sequentially changed.

According to the above-mentioned structure, it is possible to generate a plurality of OPU frames in which data with different bit rates is stored in the payload area. In this way, it is possible to perform a tolerance test for the bit rate which can be stored in the payload area.

In order to achieve the object, according to another aspect of the invention, an OPU frame generating device includes a frequency setting unit (11) that sets an arbitrary frequency which can be stored in a payload area, a first oscillating unit (12) that generates a first clock signal at the frequency set by the frequency setting unit, a data generating unit (13) that generates data in synchronization with the first clock signal, a parameter calculating unit (14) that calculates a parameter $C_m$ indicating an integer part of the amount of data included in the payload area using the frequency of the first clock signal, a data inserting unit (15) that inserts the data generated by the data generating unit at a position determined by the parameter $C_m$ calculated by the parameter calculating unit in the payload area, a buffer (18) that adjusts the timing of the data generated by the data generating unit so as to be synchronized with the time when the data inserting unit inserts the data, a frame generating unit (16) that generates an OPU frame having the in payload area into which the data is inserted by the data inserting unit, and a second oscillating unit (17) that generates a second clock signal for driving the parameter calculating unit, the data inserting unit, and the frame generating unit.

Since the OPU frame generating device according to the above-mentioned aspect of the invention includes the frequency setting unit (11), the first oscillating unit (12), and the data generating unit (13), it can generate data with an arbitrary bit rate which can be stored in the payload area. Since the OPU frame generating device according to the above-mentioned aspect of the invention includes the parameter calculating unit (14), the data inserting unit (15), the frame generating unit (16), the buffer (18), and the second oscillating unit (17), it can generate the OPU frame in which data with an arbitrary bit rate which can be stored in the payload area is stored in the payload area.

In the OPU frame generating device according to the above-mentioned aspect of the invention, the frequency setting unit may set an arbitrary frequency range corresponding to the bit rate of the data which can be stored in the payload area and sequentially change the frequency of the first clock signal in the set frequency range. The data generating unit may sequentially generate data in synchronization with the first clock signal which is sequentially changed. The parameter calculating unit may sequentially calculate the parameter $C_m$ using the frequency of the first clock signal which is sequentially changed. The data inserting unit may acquire the data generated by the data generating unit which has the same frequency as that of the first clock signal and the parameter $C_m$ calculated by the parameter calculating unit, and insert the acquired data at a position determined by the acquired parameter $C_m$ in the payload area.

According to the above-mentioned structure, it is possible to generate a plurality of OPU frames in which data with different bit rates is stored in the payload area. In this way, it is possible to perform a tolerance test for the bit rate which can be stored in the payload area.

In the OPU frame generating device according to the above-mentioned aspect of the invention, the data generating unit may generate a predetermined pattern of data.

It is possible to check whether the receiving unit correctly extracts data stored in the payload area by checking the data received by the receiving unit.

In order to achieve the object, according to still another aspect of the invention, an OPU frame test device includes the OPU frame generating device (10) according to the above-mentioned aspect of the invention, a data acquiring unit (21) that acquires data included in the payload area of the OPU frame from a receiving unit (100) which receives the OPU frame generated by the frame generating device, a determining unit (22) that determines whether the data acquired by the data acquiring unit is identical to the data generated by the data generating unit, and a display unit (23) that displays the determination result of the determining unit.

Since the OPU frame test device according to the above-mentioned aspect of the invention includes the data acquiring unit (21), the determining unit (22), and the display unit (23), it can test whether the receiving unit (100) can receive data according to GMP. Since the OPU frame test device according to the above-mentioned aspect of the invention includes the OPU frame generating device (10), the receiving unit (100) can receive the OPU frame in which data with an arbitrary bit rate which can be stored in the payload area is stored in the payload area. Therefore, the OPU frame test device according to the above-mentioned aspect of the invention can test whether the receiving unit (100) can correctly extract data from the payload area in which data with an arbitrary bit rate is stored.

In order to achieve the object, according to yet another aspect of the invention, an OPU frame generating method includes a frequency setting step (S101) of setting an arbitrary frequency which can be stored in a payload area, a data generating step (S102) of calculating a parameter $C_m$ indicating an integer part of the amount of data included in the payload area using the frequency set in the frequency setting step, generating data in synchronization with the timing determined by the calculated parameter $C_m$, and inserting the generated data at a position determined by the calculated parameter $C_m$ in the payload area, and a frame generating step (S104) of generating an OPU frame having the payload area in which the data is inserted in the data generating step.

Since the OPU frame generating method according to the above-mentioned aspect includes the frequency setting step (S101) and the data generating step (S102), it can generate data with an arbitrary bit rate which can be stored in the payload area. Since the OPU frame generating method according to the above-mentioned aspect includes the frame generating step (S104), it can generate the OPU frame in which data with an arbitrary bit rate is stored in the payload area.

In the OPU frame generating method according to the above-mentioned aspect, the frequency setting step may set an arbitrary frequency range which can be stored in the payload area. After the frame generating step, the frequency setting step may be performed to sequentially change the set frequency in the frequency range.

According to the above-mentioned structure, it is possible to generate a plurality of OPU frames in which data with different bit rates is stored in the payload area. In this way, it is possible to perform a tolerance test for the bit rate which can be stored in the payload area.

In order to achieve the object, according to still yet another aspect of the invention, an OPU frame generating method includes a frequency setting step (S101) of setting an oscillating frequency of a first oscillating unit to an arbitrary frequency which can be stored in a payload area, a data generating step (S102) of generating data in synchronization with a first clock signal from the first oscillating unit, calculating a parameter $C_m$ indicating an integer part of the amount of data included in the payload area using the frequency of the first clock signal, in synchronization with a second clock signal from a second oscillating unit different from the first oscillating unit, and inserting the generated data at a position determined by the calculated parameter $C_m$ in the payload area, and a frame generating step (S104) of generating an OPU frame having the payload area in which the data is inserted in synchronization with the second clock signal.

Since the OPU frame generating method according to the above-mentioned aspect of the invention includes the frequency setting step (S101) and the data generating step (S102), it can generate data with an arbitrary bit rate which can be stored in the payload area. Since the OPU frame generating method according to the above-mentioned aspect of the invention includes the frame generating step (S104), it can generate the OPU frame in which data with an arbitrary bit rate is stored in the payload area.

In the OPU frame generating method according to the above-mentioned aspect, the frequency setting step may set an arbitrary frequency range which can be stored in the payload area. After the frame generating step, the frequency setting step may be performed to sequentially change the oscillating frequency of the first oscillating unit in the frequency range.

According to the above-mentioned structure, it is possible to generate a plurality of OPU frames in which data with different bit rates is stored in the payload area. In this way, it is possible to perform a tolerance test for the bit rate which can be stored in the payload area.

In the OPU frame generating method according to the above-mentioned aspect, the data generating step may generate a predetermined pattern of data.

It is possible to check whether the receiving unit correctly extracts data stored in the payload area by checking the data received by the receiving unit.

In order to achieve the object, according to yet still another aspect of the invention, there is provided an OPU frame generating program that allows a computer to perform the frequency setting step, the data generating step, and the frame generating step according to the above-mentioned aspect.

According to the above-mentioned structure, it is possible to perform the OPU frame generating method according to the above-mentioned aspect using the computer. Therefore, it is possible to generate the OPU frame having the payload area in which data with an arbitrary bit rate which can be stored in the payload area is stored in the payload area.

In order to achieve the object, according to still yet another aspect of the invention, an OPU frame test method includes an OPU frame transmitting step (S201) of transmitting an OPU frame which is generated by the OPU frame generating method according to the above-mentioned aspect, a data acquiring step (S202) of acquiring data included in the payload area of the OPU frame from a receiving unit (100) which receives the OPU frame transmitted in the OPU frame transmitting step, a determining step (S203) of determining whether the data acquired in the data acquiring step is identical to the data generated in the data generating step, and a display step (S204) of displaying the determination result in the determining step.

Since the OPU frame test method according to the above-mentioned aspect of the invention includes the data acquiring step (S202), the determining step (S203), and the display step (S204), it can test whether the receiving unit (100) can receive data according to GMP. Since the OPU frame test method according to the above-mentioned aspect of the invention includes the OPU frame transmitting step (S201), the receiving unit (100) can receive the OPU frame in which data with an arbitrary bit rate which can be stored in the payload area is stored in the payload area. Therefore, the OPU frame test method according to the above-mentioned aspect of the invention can test whether the receiving unit (100) can correctly extract data from the payload area in which data with an arbitrary bit rate is stored.

In order to achieve the object, according to still yet another aspect of the invention, there is provided an OPU frame test program that allows a computer to perform the OPU frame transmitting step, the data acquiring step, the determining step, and the display step according to the above-mentioned aspect.

According to the above-mentioned structure, it is possible to perform the OPU frame test method according to the above-mentioned aspect using the computer. Therefore, it is possible to generate the OPU frame having the payload area in which data with an arbitrary bit rate which can be stored in the payload area is stored in the payload area.

Advantage of the Invention

According to the above-mentioned aspects of the invention, it is possible to generate an OPU frame having a payload area in which data with an arbitrary bit rate which can be stored in the payload area is stored in the payload area.

BEST MODE FOR CARRYING OUT THE INVENTION

Figure 1:
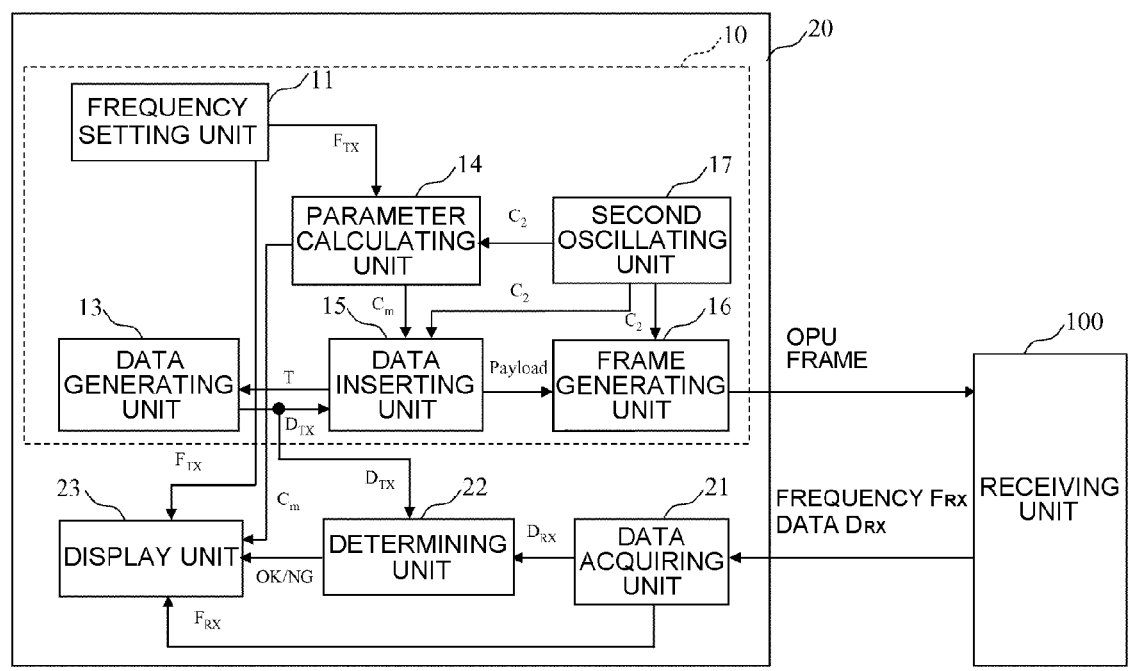
FIG. 1 is a diagram illustrating an example of a bandwidth control evaluation device according to a first embodiment.

Hereinafter, exemplary embodiments of the invention will be described with reference to the accompanying drawings. The following embodiments of the invention are illustrative, but the invention is not limited to the following embodiments. In the specification and the drawings, the same components are denoted by the same reference numerals.

First Embodiment

FIG. 1 shows an example of an OPU frame test device according to a first embodiment. An OPU frame test device 20 according to this embodiment includes an OPU frame generating device 10, a data acquiring unit 21, a determining unit 22, and a display unit 23. The OPU frame generating device 10 includes a frequency setting unit 11, a data generating unit 13, a parameter calculating unit 14, a data inserting unit 15, a frame generating unit 16, and a second oscillating unit 17.

Figure 2:
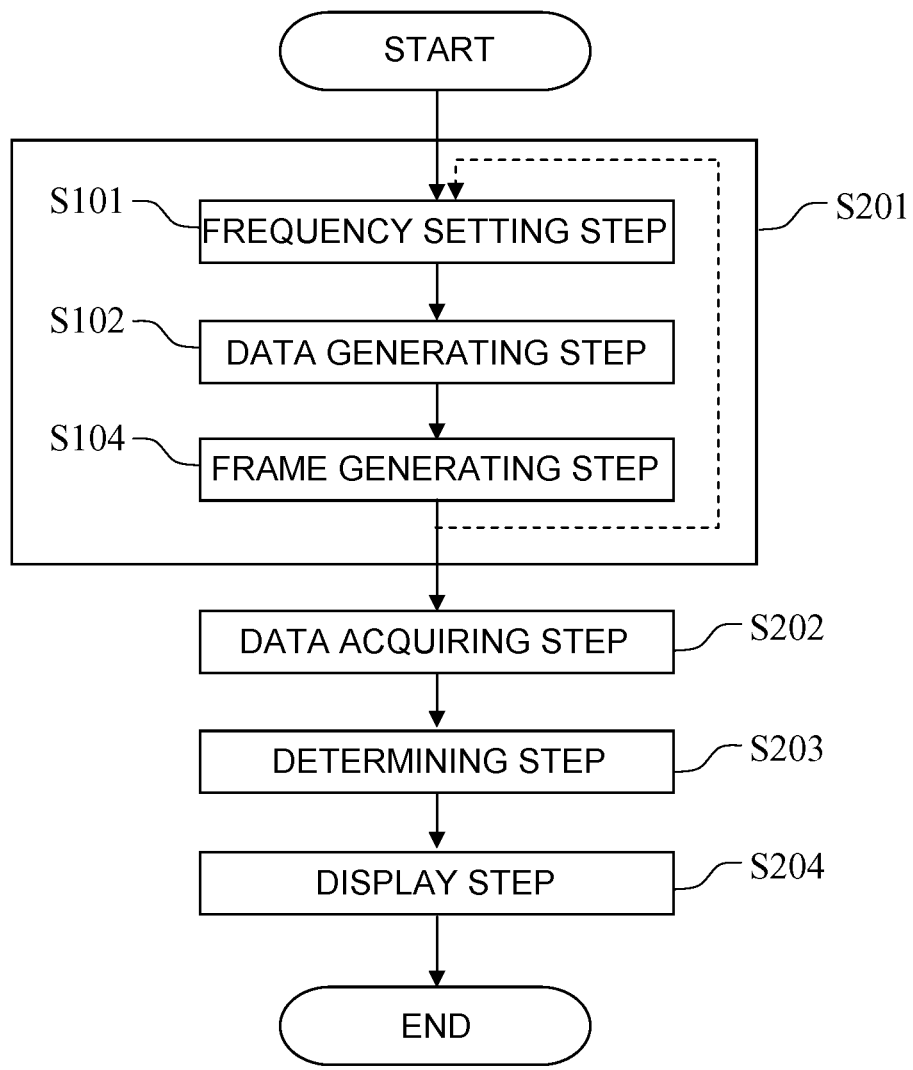
FIG. 2 is a diagram illustrating an example of an OPU frame test method according to this embodiment.

FIG. 2 shows an example of an OPU frame test method according to this embodiment. The OPU frame test method according to this embodiment includes an OPU frame transmitting step S201, a data acquiring step S202, a determining step S203, and a display step S204. An OPU frame test program according to this embodiment allows a computer to perform the OPU frame transmitting step S201, the data acquiring step S202, the determining step S203, and the display step S204.

The OPU frame transmitting step S201 transmits a generated OPU frame using an OPU frame generating method according to this embodiment. The OPU frame generating method according to this embodiment sequentially includes a frequency setting step S101, a data generating step S102, and a frame generating step S104. An OPU frame generating program according to this embodiment allows a computer to perform the frequency setting step S101, the data generating step S102, and the frame generating step S104.

In the frequency setting step S101, the frequency setting unit 11 sets an arbitrary frequency $F_{TX}$ which can be stored in a payload area. Then, the frequency setting unit 11 outputs the set frequency $F_{TX}$ to the parameter calculating unit 14. The setting of the frequency is setting an arbitrary bit rate which can be stored in the payload area. For example, in ODU 0 which is one of the ODU (Optical Channel Data Unit) standards, the maximum bit rate which can be stored in the payload area in the standard is 1.23895431 Gbit/s.

Figure 3:
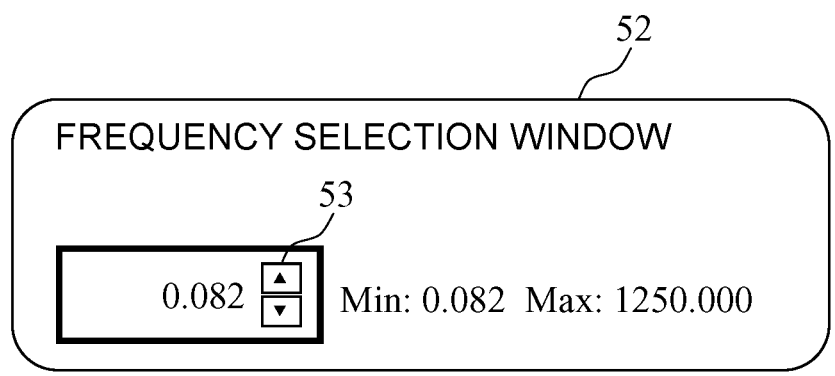
FIG. 3 is a diagram illustrating an example of a frequency setting display screen.

FIG. 3 shows an example of a frequency setting display screen. A frequency selection window 52 for inputting a frequency is displayed on the display unit 23. It is preferable that an up and down key 53 for changing the frequency in a predetermined frequency range be displayed in the frequency selection window. Any other setting methods, such as a scroll bar, may be used as long as they can change the frequency in the predetermined frequency range. The predetermined frequency range may be the range defined by the standard. Frequencies beyond the standard range may be set as long as they can be stored in the payload area.

In the data generating step S102, the OPU frame generating device 10 operates as follows. The parameter calculating unit 14 calculates a parameter $C_m$ indicating an integer part of the amount of data included in the payload area, using the frequency $F_{TX}$ from the frequency setting unit 11 and the frequency of a second clock signal (a clock signal for data insertion and data generation) $C_2$ from the second oscillating unit (oscillating unit for data insertion and data generation) 17.

The parameter $C_m$ is calculated as follows. For example, the parameter calculating unit 14 substitutes $f_{client}$ into the frequency $F_{TX}$, substitutes the frequency of the second clock signal $C_2$ into $f_{server}$, substitutes the maximum amount of data which can be inserted by the data inserting unit 15 into $B_{server}$ in units of bits, and substitutes the amount of data or the amount of stuff which is inserted to control a variation in frequency into M in units of bytes, using Expression D-13, which will be described below. The parameter calculating unit 14 calculates the parameter $C_m$ in synchronization with the second clock signal $C_2$ from the second oscillating unit 17. For example, in ODU 0, a clock signal $C_2$ with a frequency of 1.24416 GHz is generated as the second clock signal $C_2$.

Then, the data inserting unit 15 generates a timing signal T on the basis of the value of the parameter $C_m$ and outputs the timing signal T to the data generating unit 13. The data generating unit 13 generates data $D_{TX}$ in synchronization with the timing signal T from the parameter calculating unit 14. It is preferable that the data generating unit 13 generate a predetermined pattern of data such as PRBS (Pseudo-random bit sequence) data. In this way, the determining unit 22 can determine whether the data $D_{TX}$ is identical to data $D_{RX}$.

The data inserting unit 15 inserts the data $D_{TX}$ generated by the data generating unit 13 at the position determined by the parameter $C_m$ which is calculated by the parameter calculating unit 14 in the payload area. Here, the data inserting unit 15 inserts the data $D_{TX}$ in synchronization with the second clock signal $C_2$ from the second oscillating unit 17.

For example, the data inserting unit 15 determines whether the number j (j=1, ..., $P_{m,server}$) of each payload field in the payload area is stuff or data, thereby determining the insertion position of the data $D_{TX}$.

When $(j \times C_m(t)) \bmod P_{m,server} < C_m(t)$ is satisfied, that is, when the product of the payload field j and $C_m$ is divided by the maximum amount of data $P_{m,server}$ stored and the reminder of the division is less than $C_m$, it is determined that the number j is data.

When $(j \times C_m(t)) \bmod P_{m,server} \geq P\ C_m(t)$, that is, when the product of the payload field j and $C_m$ is divided by the maximum amount of data $P_{m,server}$ stored and the reminder of the division is equal to or greater than $C_m$, it is determined that the number j is stuff.

Figure 8:
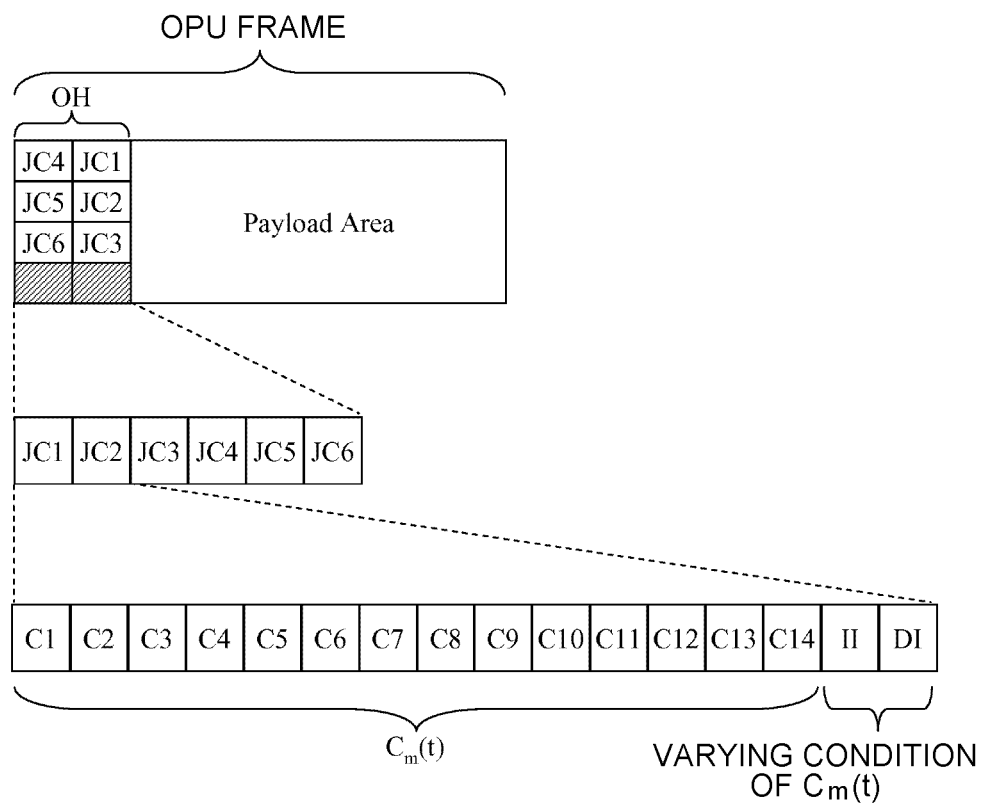
FIG. 8 is a diagram illustrating the outline of an OH of the frame defined by ITU-T Rec. G. 709 (December/2009).

In addition, the parameter calculating unit 14 calculates JC1, JC2, JC3, JC4, JC5, and JC6 to be stored in an OH. For example, the parameter calculating unit 14 calculates II and DI indicating the varying conditions of $C_m$ which are shown in FIG. 8. In addition, the parameter calculating unit 14 calculates CRC of JC1 and JC2, thereby calculating JC3. Furthermore, the parameter calculating unit 14 calculates a parameter $\Sigma C_{nD}$, thereby calculating JC4 and JC5. The parameter $\Sigma C_{nD}$ is calculated using Expression D-16, which will be described below. For example, the parameter calculating unit 14 substitutes 8 into n and substitutes 80 into M in Expression D-6 to calculate $c_n$, and calculates $C_m(t)$ from Expression D-13. Then, the parameter calculating unit 14 substitutes the calculated values into Expression D-16. In addition, the parameter calculating unit 14 calculates CRC of JC4 and JC5, thereby calculating JC6.

In the frame generating step S104, the frame generating unit 16 generates an OPU frame having the payload area into which the data $D_{TX}$ is inserted by the data inserting unit 15. Here, the frame generating unit 16 generates the OPU frame in synchronization with the second clock signal $C_2$ from the second oscillating unit 17. In this case, JC1 to JC6 calculated by the parameter calculating unit 14 are stored in the OH.

The above-mentioned OPU frame generating method can generate the OPU frame in which data with an arbitrary bit rate which can be stored in the payload area is stored. Then, the OPU frame test device 20 transmits the OPU frame generated by the OPU frame generating device 10. Then, a receiving unit 100 receives the OPU frame from the OPU frame generating device 10 and acquires the data $D_{RX}$ included in the payload area and the frequency $F_{RX}$ of the data $D_{RX}$.

As described above, the OPU frame generating device 10 and the OPU frame generating method according to this embodiment can generate the OPU frame in which the data $D_{TX}$ with a bit rate corresponding to the frequency $F_{TX}$ which is set by the frequency setting unit 11 is stored in the payload area. In this way, the receiving unit 100 can receive the OPU frame in which data with an arbitrary bit rate which can be stored in the payload area is stored in the payload area and it is possible to test the operation of the receiving unit 100 at that time.

In the data acquiring step S202, the data acquiring unit 21 acquires the data $D_{RX}$ and the frequency $F_{RX}$ from the receiving unit 100. In the determining step S203, the determining unit 22 determines whether the data $D_{RX}$ acquired by the data acquiring unit 21 is identical to the data $D_{TX}$ generated by the data generating unit 13. In the display step S204, the display unit 23 displays the determination result of the determining unit 22.

Figure 4:
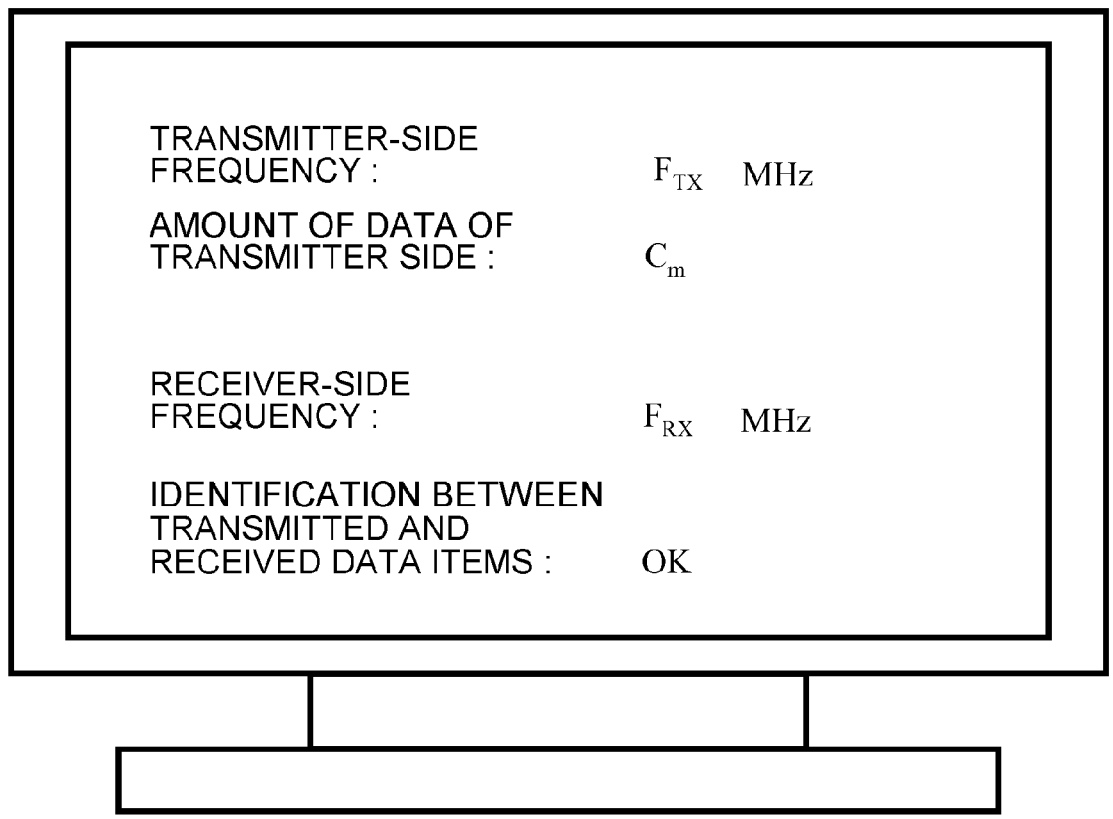
FIG. 4 is a diagram illustrating an example of the display of a display unit 23 according to the first embodiment.

FIG. 4 shows an example of the display of the display unit 23 according to the first embodiment. The display unit 23 displays the transmitter-side frequency $F_{TX}$, the amount of data $C_m$ of the transmitter side, the receiver-side frequency $F_{RX}$, and whether the transmitted and received data items are identical to each other. The transmitter-side frequency $F_{TX}$ is set by the frequency setting unit 11. The amount of data $C_m$ of the transmitter side is calculated by the parameter calculating unit 14. The receiver-side frequency $F_{RX}$ is acquired by the receiving unit 100. The determination result of the determining unit 22 is displayed in the field indicating whether the transmitted and received data items are identical to each other. The display of the transmitter-side frequency $F_{TX}$ and the receiver-side frequency $F_{RX}$ may be the display of the bit rate. In addition, instead of the receiver-side frequency $F_{RX}$, the difference between the transmitter-side frequency $F_{TX}$ and the receiver-side frequency $F_{RX}$ with respect to the transmitter-side frequency $F_{TX}$ may be displayed in parts per million.

As described above, the OPU frame test device 20 and the OPU frame test method according to this embodiment can transmit the OPU frame in which data with an arbitrary bit rate which can be stored in the payload area is stored in the payload area such that the receiving unit 100 receives the OPU frame and determine whether the receiving unit 100 can correctly receive data.

Second Embodiment

In an OPU frame test device 20 according to a second embodiment, the frequency setting unit 11 described in the first embodiment sets an arbitrary frequency range which can be stored in the payload area. In this case, in the frequency setting step S101 shown in FIG. 2, the frequency setting unit 11 sets as the frequency $F_{TX}$ an arbitrary frequency $F_{TX\_}1$ in the frequency range that is equal to or more than a frequency $F_{TX\_}D$ and equal to or less than a frequency $F_{TX\_}U$. The setting of the arbitrary frequency may be the setting of an arbitrary bit rate.

The data generating step S102 and the frame generating step S104 are performed using the frequency $F_{TX\_}1$ set by the frequency setting unit 11. For example, the parameter calculating unit 14 calculates a parameter $C_{m\_}1$ using the frequency $F_{TX\_}1$. Then, the data inserting unit 15 generates a timing signal T_1 which is determined by the parameter $C_{m\_}1$ calculated by the parameter calculating unit 14 and outputs the timing signal T_1 to the data generating unit 13. Then, the data generating unit 13 generates data $D_{TX\_}1$ in synchronization with the timing signal T_1. Then, the data inserting unit 15 inserts the data $D_{TX\_}1$ generated by the data generating unit 13 at the position which is determined by the parameter $C_{m\_}1$ calculated by the parameter calculating unit 14 in the payload area. In the frame generating step S104, the frame generating unit 16 generates an OPU frame having the payload area into which the data $D_{TX\_}1$ is inserted by the data inserting unit 15.

After the frame generating step S104 shown in FIG. 2, the frequency setting step S101 is performed. In the frequency setting step S101, the frequency setting unit 11 sequentially changes the set frequency in the frequency range that is equal to or more than the frequency $F_{TX\_}D$ and equal to or less than the frequency $F_{TX\_}U$. For example, the frequency setting unit 11 changes the frequency $F_{TX\_}1$ to a frequency $F_{TX\_}2$. Then, the data generating step S102 and the frame generating step S104 are performed using the frequency $F_{TX\_}2$ set by the frequency setting unit 11. As such, the frequency setting step S101 to the frame generating step S104 are performed while the set frequency is sequentially changed in the frequency range that is equal to or more than the frequency $F_{TX\_}D$ and equal to or less than the frequency $F_{TX\_}U$.

In the data acquiring step S202, the data acquiring unit 21 acquires the data $D_{RX}$ and the frequency $F_{RX}$ from the receiving unit 100. In the determining step S203, the determining unit 22 determines whether the data $D_{RX}$ acquired by the data acquiring unit 21 is identical to the data $D_{TX}$ generated by the data generating unit 13. In this case, data items with the same transmitter-side frequency $F_{TX}$ and receiver-side frequency $F_{RX}$ are compared with each other. Then, data is output for each frequency.

Figure 5:
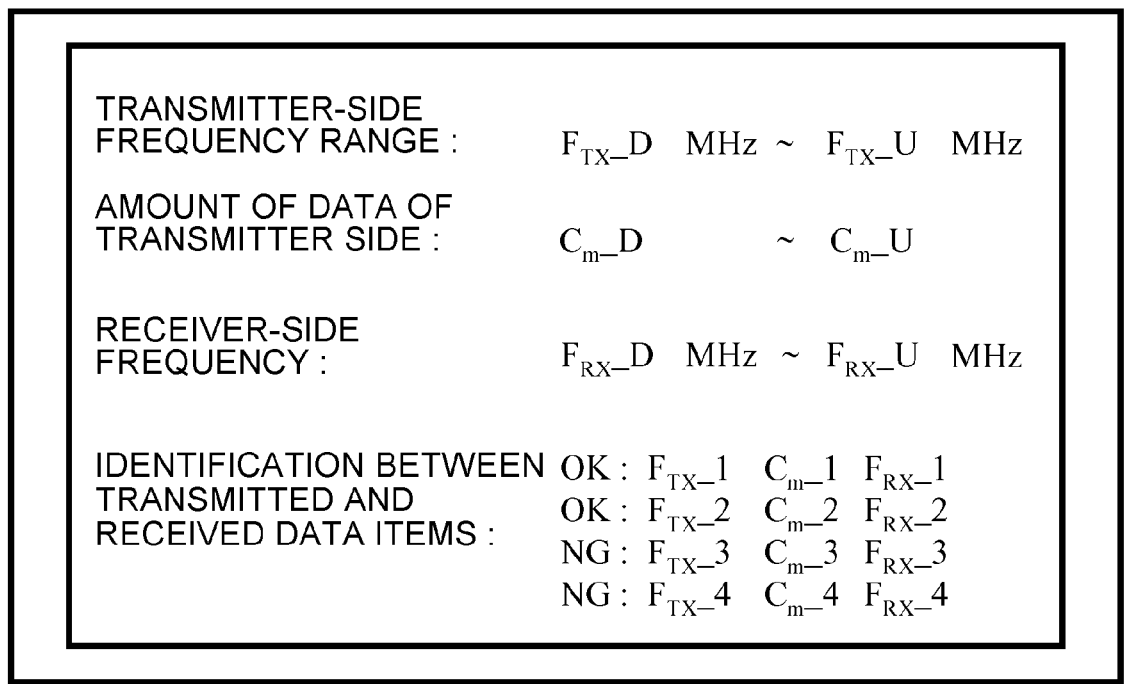
FIG. 5 is a diagram illustrating an example of the display of a display unit 23 according to a second embodiment.

In the display step S204, the display unit 23 displays the determination result of the determining unit 22 for each frequency. FIG. 5 shows an example of the display of the display unit 23 according to the second embodiment. The display unit 23 displays the lower limit $F_{TX\_}D$ of the transmitter-side frequency, the amount of data $C_{m\_}D$ of the transmitter side at the lower limit $F_{TX\_}D$ of the transmitter-side frequency, and a frequency $F_{RX\_}D$ acquired from the receiving unit 100 which receives the OPU frame of the lower limit $F_{TX\_}D$ of the transmitter-side frequency. In addition, the display unit 23 displays the upper limit $F_{TX\_}U$ of the transmitter-side frequency, the amount of data $C_{m\_}U$ of the transmitter side at the upper limit $F_{TX\_}U$ of the transmitter-side frequency, and a frequency $F_{RX\_}U$ acquired from the receiving unit 100 which receives the OPU frame of the upper limit $F_{TX\_}U$ of the transmitter-side frequency. The display unit 23 displays the determination result of the determining unit 22 at each frequency for each frequency. The display of the transmitter-side frequency $F_{TX}$ and the receiver-side frequency $F_{RX}$ may be the display of the bit rate. In addition, instead of the receiver-side frequency $F_{RX}$, the difference between the transmitter-side frequency $F_{TX}$ and the receiver-side frequency $F_{RX}$ with respect to the transmitter-side frequency $F_{TX}$ may be displayed in parts per million.

As described above, the OPU frame generating device 10, the OPU frame generating method, the OPU frame test device 20, and the OPU frame test method according to this embodiment can sequentially change the frequency in the set frequency range equal to or more than the frequency $F_{TX\_}D$ and equal to or less than the frequency $F_{RX\_}U$ which can be stored in the payload area, thereby generating data items $D_{TX\_}D$ to $D_{TX\_}U$ and the OPU frame in which the data $D_{TX}$ is stored in the payload area. In this way, the receiving unit 100 can receive the OPU frame in which data with a bit rate that is equal to or more than the frequency FTX_D and equal to or less than the frequency FRX_U is stored in the payload area and it is possible to test the operation of the receiving unit 100 at that time.

Third Embodiment

Figure 6:
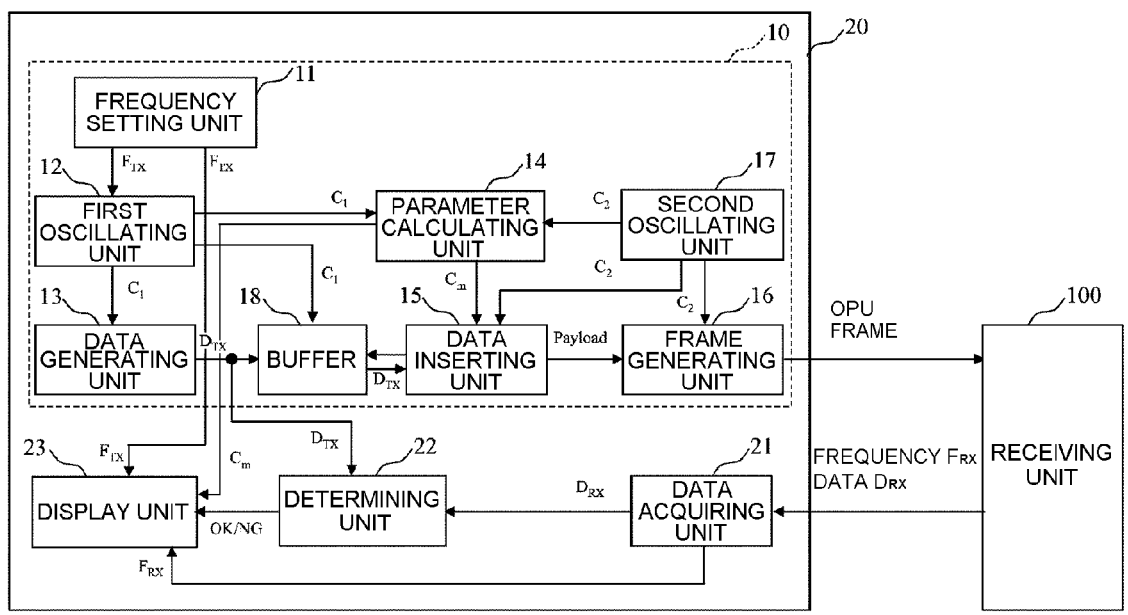
FIG. 6 is a diagram illustrating an example of a bandwidth control evaluation device according to a third embodiment.
Figure 7:
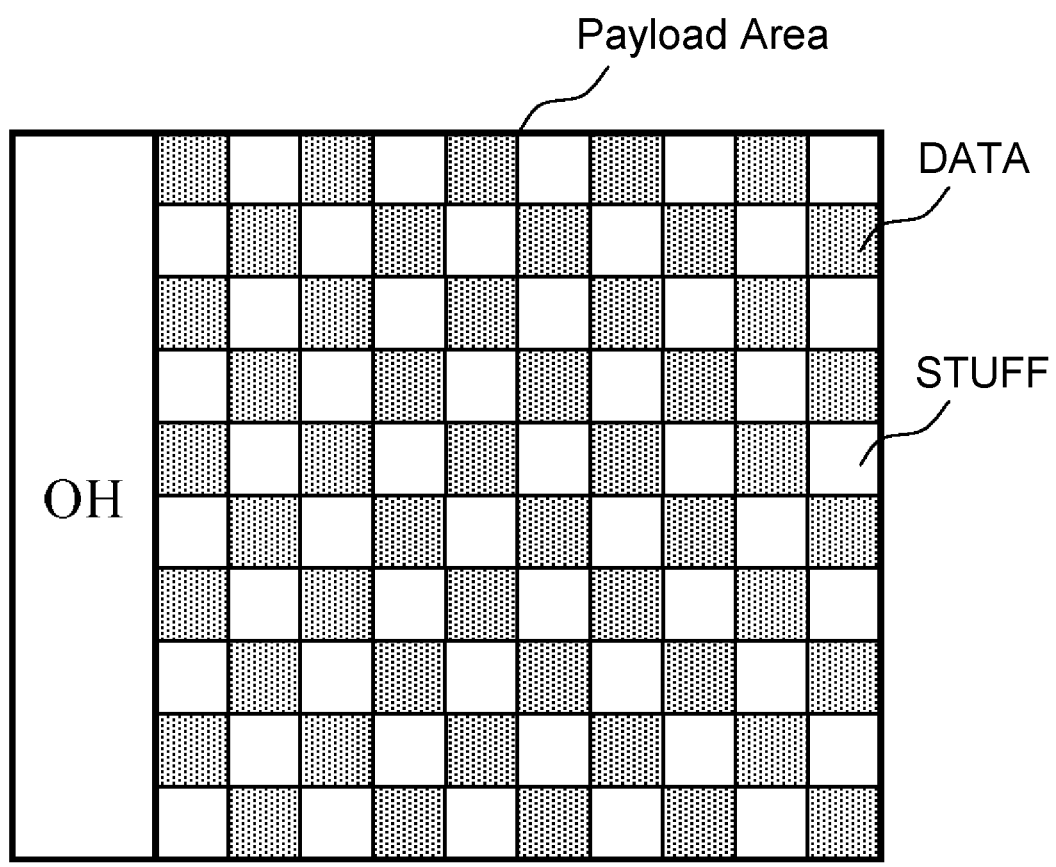
FIG. 7 is a diagram illustrating an example of an OPU frame in which data and stuff are distributed according to GMP.

FIG. 6 shows an example of an OPU frame test device according to a third embodiment. The OPU frame test device according to this embodiment differs from the OPU frame generating device 10 according to the first embodiment in that it further includes a first oscillating unit 12 and a buffer 18 and in the operation of the data generating unit 13 and the data inserting unit 15.

An OPU frame test method and an OPU frame test program according to this embodiment differ from those according to the first embodiment in the OPU frame transmitting step S201. In addition, an OPU frame generating method and an OPU frame generating program according to this embodiment differ from those according to the first embodiment in the data generating step S102.

In the data generating step S102, an OPU frame generating device 10 operates as follows. The first oscillating unit (oscillating unit for data generation) 12 generates a first clock signal (clock signal for data generation) $C_1$ at the frequency set by the frequency setting unit 11. For example, in ODU 0, a clock signal with a frequency of 1.23895431 GHz is generated as the first clock signal $C_1$. Then, the data generating unit 13 generates data $D_{TX}$ in synchronization with the first clock signal $C_1$.

The parameter calculating unit 14 calculates a parameter $C_m$ indicating an integer part of the amount of data included in the payload area, using the frequency of the first clock signal $C_1$ and the frequency of a second clock signal $C_2$ from the second oscillating unit 17.

The data inserting unit 15 inserts the data $D_{TX}$ generated by the data generating unit 13 at the position determined by the parameter $C_m$ which is calculated by the parameter calculating unit 14 in the payload area. In this case, the buffer 18 adjusts the timing of the data generated by the data generating unit 13 so as to be synchronized with the time when the data inserting unit 15 inserts data. The buffer 18 is, for example, a FIFO.

Even when the data generating step S102 is performed, it is possible to generate the OPU frame in which data with an arbitrary bit rate which can be stored in the payload area is stored. Therefore, the OPU frame generating device 10 and the OPU frame generating method according to this embodiment can generate the OPU frame in which the data $D_{TX}$ with a bit rate corresponding to the frequency $F_{TX}$ set by the frequency setting unit 11 is stored in the payload area. In this way, a receiving unit 100 can receive the OPU frame in which data with an arbitrary bit rate which can be stored in the payload area is stored in the payload area and it is possible to test the operation of the receiving unit 100 at that time.

Fourth Embodiment

In an OPU frame test device 20 according to a fourth embodiment, the frequency setting unit 11 described in the third embodiment sets an arbitrary frequency range which can be stored in the payload area. In this case, in the frequency setting step S101 shown in FIG. 2, the frequency setting unit 11 sets as the frequency $F_{TX}$ an arbitrary frequency $F_{TX\_}1$ in the frequency range that is equal to or more than the frequency $F_{TX\_}D$ and equal to or less than the frequency $F_{TX\_}U$. The setting of the arbitrary frequency may be the setting of an arbitrary bit rate.

Then, the data generating step S102 and the frame generating step S104 are performed using the frequency $F_{TX\_}1$ set by the frequency setting unit 11. For example, the first oscillating unit 12 generates a first clock signal $C_1$ at the frequency $F_{TX\_}1$ set by the frequency setting unit 11. Then, the parameter calculating unit 14 sequentially calculates a parameter $C_{m\_}1$ using the frequency $F_{TX\_}1$ of the first clock signal $C_1$. Then, the data inserting unit 15 inserts the data $D_{TX\_}1$ generated by the data generating unit 13 at the position determined by the parameter $C_{m\_}1$ which is calculated by the parameter calculating unit 14 in the payload area. In the frame generating step S104, the frame generating unit 16 generates an OPU frame having the payload area into which the data $D_{TX\_}1$ is inserted by the data inserting unit 15.

After the frame generating step S104 shown in FIG. 2, the frequency setting step S101 is performed. In the frequency setting step S101, the frequency setting unit 11 sequentially changes the set frequency in the frequency range that is equal to or more than the frequency $F_{TX\_}D$ and equal to or less than the frequency $F_{TX\_}U$. For example, the frequency setting unit 11 changes the frequency $F_{TX\_}1$ to a frequency $F_{TX\_}2$. Then, the data generating step S102 and the frame generating step S104 are performed using the frequency $F_{TX\_}2$ set by the frequency setting unit 11. As such, the frequency setting step S101 to the frame generating step S104 are performed while the set frequency is sequentially changed in the frequency range that is equal to or more than the frequency $F_{TX\_}D$ and equal to or less than the frequency $F_{TX\_}U$.

As described above, the OPU frame generating device 10, the OPU frame generating method, the OPU frame test device 20, and the OPU frame test method according to this embodiment can sequentially change the set frequency in the frequency range equal to or more than frequency $F_{TX\_}D$ and equal to or less than the frequency $F_{RX\_}U$ which can be stored in the payload area to generate the data items $D_{TX\_}D$ to $D_{TX\_}U$ and generate the OPU frame in which the data $D_{TX}$ is stored in the payload area. In this way, the receiving unit 100 can receive the OPU frame in which data with a bit rate that is equal to or more than the frequency $F_{TX\_}D$ and equal to or less than the frequency $F_{RX\_}U$ is stored in the payload area and it is possible to test the operation of the receiving unit 100 at that time.

Next, the details of the parameter calculating unit 14 will be described.

For example, the parameter calculating unit 14 calculates the parameter $C_m$ as follows.

The amount of n-bit data (a bundle of n bits) reaching a given frame period or multiframe period is represented as follows:

[Equation 1]

$$c_n = \left( \frac{f_{client}}{n} \times T_{server} \right) \qquad \text{(Expression D-1)}$$

(where $f_{client}$ indicates a client bit rate, $T_{server}$ indicates a frame period of the server frame or server multiframe, and $c_n$ indicates the number of client n-bit data entities per server frame or server multiframe).

$T_{server}$ is represented by the following expression:

[Equation 2]

$$T_{server} = \frac{B_{server}}{f_{server}} \qquad \text{(Expression D-5)}$$

(where $f_{server}$ indicates a server bit rate and $B_{server}$ indicates bits per server frame or multiframe).

Expression D-1 is represented as follows using the relationship of Expression D-5:

[Equation 3]

$$c_n = \left( \frac{f_{client}}{f_{server}} \times \frac{B_{server}}{n} \right). \qquad \text{(Expression D-6)}$$

GMP is used to store CBR (Constant Bit Rate) data in OPUk or LO ODUj (via ODTUk. ts).

In GMP of OTN, data is basically mapped in units of 8 bits (n=8, C8). When m=8×Mbit is established, the target amount of data is obtained by dividing the product of the total bit and $c_n$ by m. As such, when data is divided in units of 8 bits, the amount of data $c_m$ to be stored is represented as follows:

[Equation 4]

$$c_n = \left( \frac{n \times c_n}{m} \right)\left( \frac{f_{client}}{f_{server}} \times \frac{B_{server}}{m} \right) = \left( \frac{f_{client}}{f_{server}} \times \frac{B_{server}/8}{M} \right). \qquad \text{(Expression D-12)}$$

Since an integer value is transmitted, the integer value of $c_m$ is represented by $C_m(t)$.

[Equation 5]

$$C_m(t) = \text{int}(c_m) = \text{int}\left(\frac{f_{client}}{f_{server}} \times \frac{B_{server}/8}{M}\right) \quad \text{(Expression D-13)}$$

The upper limit (ceiling) and the lower limit (floor) of the integer value are represented as follows:

[Equation 6]

$$C_m(t) = \text{floor}\left(\frac{f_{client}}{f_{server}} \times \frac{B_{server}/8}{M}\right) \quad \text{(Expression D-14)}$$

$$C_m(t) = \text{ceiling}\left(\frac{f_{client}}{f_{server}} \times \frac{B_{server}/8}{M}\right).$$

In the amount of data to be stored in the payload area which is represented by Expression D-6, the amount of data $C_{nD}$ which is not stored in the payload area by $C_m$ is represented as follows:

[Equation 7]

$$C_{nD} = c_n - \left(\frac{8 \times M}{n} \times C_m(t)\right). \quad \text{(Expression D-15)}$$

The integer value $C_{nD}(t)$ is represented as follows:

[Equation 8]

$$C_{nD}(t) = \quad \text{(Expression D-16)}$$
$$\text{int}(c_n) - \left(\frac{8 \times M}{n} \times C_m(t)\right) = C_n(t) - \left(\frac{8 \times M}{n} \times C_m(t)\right)$$

(where $C_{nD}(t)$ is a value between $(1-8\times M/n)$ and $(8\times M/n-1)$).

INDUSTRIAL APPLICABILITY

The invention can be applied to the information and communication industry.

DESCRIPTION OF REFERENCE NUMERALS AND SIGNS

10: OPU FRAME GENERATING DEVICE
11: FREQUENCY SETTING UNIT
12: FIRST OSCILLATING UNIT
13: DATA GENERATING UNIT
14: PARAMETER CALCULATING UNIT
15: DATA INSERTING UNIT
16: FRAME GENERATING UNIT
17: SECOND OSCILLATING UNIT
18: BUFFER
20: OPU FRAME TEST DEVICE
21: DATA ACQUIRING UNIT
22: DETERMINING UNIT
23: DISPLAY UNIT
52: FREQUENCY SELECTION WINDOW
53: UP AND DOWN KEY
100: RECEIVING UNIT

The invention claimed is:

1. An Optical channel Payload Unit (OPU) frame device comprising:
a frame generating unit that generates an OPU frame having a payload area;
a second oscillating unit that generates a second clock signal for driving the frame generating unit;
a frequency setting unit that sets an arbitrary frequency corresponding to a bit rate of data which can be stored in the payload area;
a parameter calculating unit that calculates a parameter $C_m$ indicating an integer part of an amount of data included in the payload area using the arbitrary frequency set by the frequency setting unit;
a data inserting unit that outputs a timing signal determined by the parameter $C_m$ calculated by the parameter calculating unit and inserts data at a position determined by the parameter $C_m$ in the payload area; and
a data generating unit that generates data in synchronization with the timing signal and outputs the generated data to the data inserting unit,
wherein the frame generating unit generates the OPU frame having the payload area into which the data has been inserted by the data inserting unit,
the second clock signal drives the parameter calculating unit and the data inserting unit, in addition to the frame generating unit,
the frequency setting unit sets an arbitrary frequency range corresponding to the bit rate of the data which can be stored in the payload area and sequentially changes the arbitrary frequency in the set arbitrary frequency range,
the parameter calculating unit sequentially calculates the parameter $C_m$ using the frequency which is sequentially changed,
the data inserting unit acquires the parameter $C_m$ which is sequentially calculated from the parameter calculating unit, sequentially generates the timing signal using the parameter $C_m$ which is sequentially calculated and inserts the generated data with a common frequency from the data generating unit at a position determined by the acquired parameter $C_m$ in the payload area, and
the data generating unit sequentially generates data in synchronization with the timing signal which is sequentially changed.

2. The OPU frame device according to claim 1,
wherein the data generating unit generates a predetermined pattern of data.

3. The OPU frame device according to claim 1, further comprising:
a data acquiring unit that acquires data included in the payload area of the OPU frame from a receiving unit which receives the OPU frame generated by the frame generating device;
a determining unit that determines whether the data acquired by the data acquiring unit is identical to the data generated by the data generating unit; and
a display unit that displays the determination result of the determining unit.

4. An Optical channel Payload Unit (OPU) frame generating device comprising:
a frame generating unit that generates an OPU frame having a payload area;
a second oscillating unit that generates a second clock signal for driving the frame generating unit;

a frequency setting unit that sets an arbitrary frequency corresponding to a bit rate of data which can be stored in the payload area;

a first oscillating unit that generates a first clock signal at the arbitrary frequency set by the frequency setting unit;

a data generating unit that generates data in synchronization with the first clock signal;

a parameter calculating unit that calculates a parameter $C_m$ indicating an integer part of an amount of data included in the payload area using the arbitrary frequency of the first clock signal;

a data inserting unit that inserts the data generated by the data generating unit at a position determined by the parameter $C_m$ which is calculated by the parameter calculating unit in the payload area; and a buffer that adjusts timing of the data generated by the data generating unit so as to be synchronized with a time when the data inserting unit inserts the generated data, wherein the frame generating unit generates the OPU frame having the payload area into which the generated data is inserted by the data inserting unit, the second clock signal drives the parameter calculating unit and the data inserting unit, in addition to the frame generating unit, the frequency setting unit sets an arbitrary frequency range corresponding to the bit rate of the data which can be stored in the payload area and sequentially changes the arbitrary frequency of the first clock signal in the set arbitrary frequency range, the data generating unit sequentially generates data in synchronization with the first clock signal which is sequentially changed, the parameter calculating unit sequentially calculates the parameter $C_m$ using the arbitrary frequency of the first clock signal which is sequentially changed, and the data inserting unit acquires the data generated by the data generating unit which has the same frequency as that of the first clock signal and the parameter $C_m$ calculated by the parameter calculating unit, and inserts the acquired data at a position determined b the acquired parameter $C_m$ in the payload area.

5. An Optical channel Payload Unit (OPU) frame generating method comprising:

a frame generating step of generating an OPU frame having a payload area;

a frequency setting step of setting an arbitrary frequency corresponding to a bit rate of data which can be stored in the payload area;

a data generating step of calculating a parameter $C_m$ indicating an integer part of an amount of data included in the payload area using the arbitrary frequency set in the frequency setting step, generating data in synchronization with a timing determined by the calculated parameter $C_m$, and inserting the generated data at a position determined by the calculated parameter $C_m$ in the payload area;

an OPU frame transmitting step of transmitting the OPU frame generated by the frame generating step;

a data acquiring step of acquiring data included in the payload area of the OPU frame from a receiving unit which receives the OPU frame transmitted in the OPU frame transmitting step;

a determining step of determining whether the data acquired in the data acquiring step is identical to the data generated in the data generating step; and a display step of displaying the determination result in the determining step, wherein the frame generating step includes a step of generating the OPU frame having the payload area into which the data is inserted in the data generating step, the frequency setting step sets an arbitrary frequency range corresponding to the bit rate of the data which can be stored in the payload area and, after the frame generating step, the frequency setting step sequentially changes the arbitrary frequency in the set arbitrary frequency range, the data generating step sequentially calculates the parameter $C_m$ using the arbitrary frequency which is sequentially changed, the data generating step acquires the parameter $C_m$ which is sequentially calculated, sequentially generates a timing signal using the parameter $C_m$ which is sequentially calculated, and inserts the generated data with a common frequency at a position determined by the acquired parameter $C_m$ in the payload area, and the data generating step sequentially generates data in synchronization with the timing signal which is sequentially changed.

6. The OPU frame generating method according to claim 5, wherein the data generating step generates a predetermined pattern of data.

7. A non-transitory computer readable medium having instructions that allows a computer to perform the entire method according to claim 5.

8. An Optical channel Payload Unit (OPU) frame generating method comprising:

a frame generating step of generating an OPU frame having a payload area;

a frequency setting step of setting an oscillating frequency of a first oscillating unit to an arbitrary frequency corresponding to a bit rate of data which can be stored in the payload area;

a data generating step of generating data in synchronization with a first clock signal from the first oscillating unit, calculating a parameter $C_m$ indicating an integer part of an amount of data included in the payload area using the arbitrary frequency of the first clock signal, in synchronization with a second clock signal from a second oscillating unit different from the first oscillating unit, and inserting the generated data at a position determined by the calculated parameter $C_m$ in the payload area;

an OPU frame transmitting step of transmitting the OPU frame generated by the frame generating step;

a data acquiring step of acquiring data included in the payload area of the OPU frame from a receiving unit which receives the OPU frame transmitted in the OPU frame transmitting step;

a determining step of determining whether the data acquired in the data acquiring step is identical to the data generated in the data generating step; and a display step of displaying the determination result in the determining step, wherein the frame generating step includes a step of generating the OPU frame having the payload area into which the data is inserted in synchronization with the second clock signal, the frequency setting step sets an arbitrary frequency range corresponding to the bit rate of the data which can be stored in the payload area, and after the frame generating step, the frequency setting step sequentially changes the oscillating frequency of the first oscillating unit in the arbitrary frequency range, the data generating step sequentially generates data in synchronization with the first clock signal which is sequentially changed, the data generating step sequentially calculates the parameter $C_m$ using the arbitrary frequency of the first clock signal which is sequentially changed, and the data generating step acquires the generated data which has the same frequency as that of the first clock signal and the calculated parameter $C_m$, and inserts the acquired data at a position determined b the acquired parameter $C_m$ in the payload area.

* * * * *